United States Patent Office 3,215,701
Patented Nov. 2, 1965

3,215,701
PROCESS FOR THE PREPARATION OF 3-AMINO-2-OXAZOLIDONE HYDROCHLORIDE
Jean-Louis Pomot, Neuilly-sur-Seine, France, assignor to The Norwich Pharmacal Company
No Drawing. Filed June 20, 1963, Ser. No. 289,383
3 Claims. (Cl. 260—307)

The present invention relates to a new process for the preparation of 3-amino-2-oxazolidone hydrochloride. There is great interest in the salts of 3-amino-2-oxazolidone for their use in a reaction with aldehydes or ketones, to obtain hydrazones corresponding to the general formula:

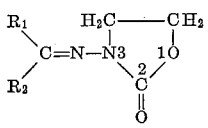

in which $R_1$ and $R_2$ represent, either an atom of hydrogen or an alkyl group, substituted or not, or an isocyclic group, substituted or not, or a heterocyclic nucleus, substituted or not.

3-amino-2-oxazolidone hydrochloride may be used especially in the manufacture of certain compounds known for their therapeutic properties such as (5-nitrofurylidene)-3-amino-2-oxazolidone, by reaction with 5-nitrofurfural or with its diacetate.

The present invention has been conceived, notably, in order to procure cheaply an aqueous acid solution of 3-amino-2-oxazolidone hydrochloride which may be utilized as an intermediate in a variety of chemical synthesis.

It has been conceived, particularly, with the view of the possibility of obtaining such a solution in several stages carried out successively with the same apparatus, without isolation of intermediary products.

This invention provides a short, new, economical process for the preparation of 3-amino-2-oxazolidone hydrochloride which comprises
 (a) Heating a mixture of monoethanolamine and urea,
 (b) Cooling and nitrosating,
 (c) Heating to liberate nitrogen,
 (d) Cooling and nitrosating,
 (e) Cooling and reducing,
 (f) Filtering to obtain said 3-amino-2-oxazolidone hydrochloride.

Additionally, and in the course of this process a new compound, N-nitrosohydroxyethyl urea is produced and can be isolated by the process which comprises
 (a) Heating a mixture of monoethanolamine and urea,
 (b) Cooling and nitrosating, and
 (c) Isolating said N-nitrosohydroxyethyl urea.

According to a particularity of the invention, the process comprehends the reduction of 3-nitroso-2-oxazolidone by means of zinc and hydrochloric acid with a high induction of heat to obtain a high yield of 3-amino-2-oxazolidone hydrochloride in aqueous solution.

Another specialty of the invention lies in the preparation of an aqueous solution of 3-nitroso-2-oxazolidone containing, in advance, the amount of hydrochloric acid required for reduction to the amino compound, by two successive nitrosations of beta-hydroxy ethyl urea with intermediary denitrosating cyclization, whereby an aqueous acid solution of 3-amino-2-oxazolidone hydrochloride may be prepared directly from this urea using the same apparatus without isolation of the intermediary product.

In the preferred practice of this invention, it is desirable, in order to obtain the best yield, to use the minimum quantity of water for dissolution of the sodium nitrite used during the first nitrosation; this amount may be about two times the weight of the betahydroxy ethyl urea. For the same reason it is preferable to use industrial sodium nitrite in excess in relation to the quantity required in order to fix a nitro group on a molecule of beta-hydroxy ethyl urea. A convenient excess is about 10% in proportion to the stoichiometric quantity.

There is an advantage in preparing, from the very first, such an aqueous solution of sodium nitrite and of beta-hydroxy ethyl urea and of gradually introducing it afterward into the concentrated hydrochloric acid in order to produce a nitrosation according to the equation

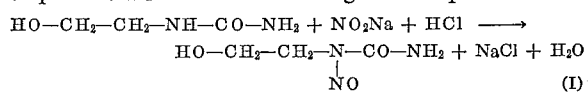

The nitroso beta-hydroxy ethyl urea (I) is very unstable and decomposes rapidly, as soon as its aqueous solution reaches a temperature above 20° C., to yield the oxazolidone, by denitrosation beginning with nitrogen:

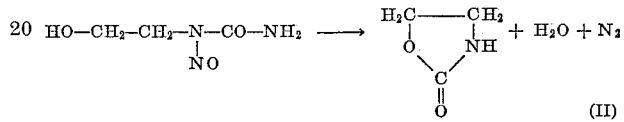

Although the invention may not be connected with any explication or hypothesis in this regard, it may be assumed that the decomposition involves the intermediary formation of hydroxy ethyl isocyanate (III) which is immediately cyclized:

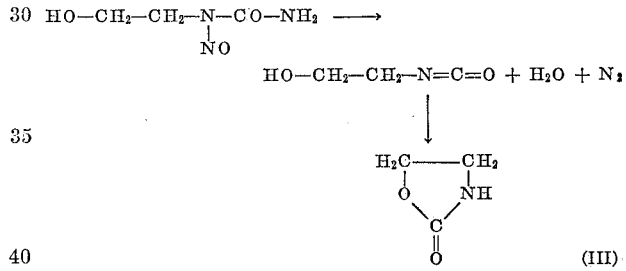

In every way, it is possible and advantageous to proceed so that the first stage of the process, leads at once to the production of a solution of oxazolidone, drawing partly on the exothermic character of the reaction. One may, particularly, gradually introduce the aqueous solution of sodium nitrite and of beta-hydroxy ethyl urea into the concentrated hydrochloric acid at a temperature of 0 to 15°, more particularly at about 10°, so that the nitrosation is carried out at a low temperature, and allow the temperature to raise spontaneously in proportion to the addition of the solution, then as the case requires, heat to at least 35°; the final temperature may be from 35 to 50° C., more especially around 40° C.; it is maintained until the cessation of the liberation of nitrogen.

The amount of hydrochloric acid employed is, preferably, calculated so that the acid assures the initial nitrosation, the nitrosation of the cyclized product, that is to say the oxazolidone, the reduction of the nitroso oxazolidone and finally the acidity of the final medium containing the amino oxazolidone. In practice, the weight of concentrated hydrochloric acid, calculated on an acid with a density of 1.19, must be at least eight times, more particularly about ten times, that of the beta-hydroxy ethyl urea used. The amount of acid used is not limited above that dictated by economic considerations.

Once the nitrogen is liberated, the solution of oxazolidone is cooled for a further nitrosation. It suffices to take the temperature down to 0° C., but a lower temperature, for example, between 0 and —15° C., is likewise convenient. Sodium nitrite is then gradually added, in an amount approximately equal to the preceding quantity, in solution in the minimum of water capable of dissolving it, probably about one to two times, particularly about 1.5 times, the weight of the nitrite. It is suitable to regulate the rate of addition so that the temperature is not raised above 10° C.

According to the equation

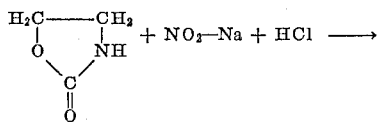

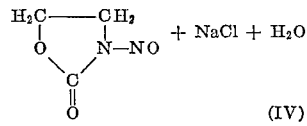

N-nitroso oxazolidone (IV) is obtained in the dissolved state. The solution likewise contains some sodium chloride from the two successive nitrosations and a sufficient quantity of hydrochloric acid to assure the reduction with zinc in the following stage.

For this latter, as was indicated above, it is of interest to carry out the reduction very rapidly, at a temperature as low as can be used industrially, for the yield is so much the better. In practice, it suffices to cool the solution to about −20° C., it being understood that a lower temperature may be used, and to add a sufficient quantity of crushed ice so that the temperature, during the reduction with zinc, does not exceed 15° C. Then the zinc powder is added in excess, all at once, this excess being 10 to 40% in proportion to the theoretical quantity, preferably from 15 to 20%. When the reduction is completed and the liberation of the hydrogen has ceased entirely, the mass is filtered to separate the solid impurities carried over from the zinc powder.

The solution thus obtained contains, besides 3-amino-2-oxazolidone hydrochloride, some sodium chloride, some zinc chloride and hydrochloric acid. It may be used, such as it is, or after neutralization with hydrochloric acid by sodium acetate, for the preparation of hydrazones by addition of aldehydes or ketones.

Beta-hydroxy ethyl urea may be prepared by application of one of the known methods of alkylation of urea;

(a) By heating equimolecular quantities of mono-ethanol-amine and urea for 4 hours at a temperature between 110 and 115° C. The beta-hydroxy ethyl urea thus obtained may be utilized in the crude state without final purification by crystallization.

(b) By boiling an aqueous solution of mono-ethanol-amine hydrochloride with an excess of urea. The solutions of beta-hydroxy ethyl urea obtained, which contain equally an excess of urea and of ammonium chloride, may be used as such for nitrosation.

(c) By reaction of potassium cyanate or of sodium cyanate upon a solution of mono-ethanolamine hydrochloride. The solution of beta-hydroxy ethyl urea obtained which contains likewise some potassium chloride or sodium chloride, may be utilized for the nitrosation.

The example below is given by way of illustrating, but not limiting, the invention:

*Example*

A mixture of

| | Grams |
|---|---|
| Mono-ethanolamine | 12 |
| Urea | 12 | was heated for 4 hours at a temperature between 110 and 115° C.

The mass was cooled to 80° C. and 35 grams of water were added. To this solution 16 grams of sodium nitrite—solution I—were added.

In a balloon flask equipped with a stirrer, a thermometer and a dropping funnel, placed in an ice bath, 230 ml. of concentrated hydrochloric acid of a density of 1.19 was introduced, and this was cooled while stirring to a temperature of +10° C.

Solution I was poured into the funnel and little by little added to the cold hydrochloric acid, the rate of inlet being regulated so that the temperature rapidly attains 25° C. and is maintained there.

When all of solution I had been added, the mass was reheated to 40° C. and this temperature was maintained till all the gases had ceased to be liberated.

Again the contents of the balloon flask were cooled by mixture of ice and salt until the temperature of the liquid reached −5° C. Then solution II, which had been prepared by dissolving 16 grams of sodium nitrite in 25 grams of water, was introduced into the funnel.

Solution II was added progressively as the mass was stirred, so that the temperature remained lower than 10° C.

After the addition of solution II, the mass was cooled to −20° C. and 200 grams of crushed ice was added. Then, all at once, 30 grams of zinc powder, passing through a 300 sieve, were poured in. The reaction was violent and the temperature rapidly increased to 10–15° C. The solution was stirred 30 minutes longer and filtered in order to separate the solid impurities coming from the zinc.

The resultant solution was of a volume of about 500 cc. and contained:

| | Grams |
|---|---|
| 3-amino-2-oxazolidone (in the form of hydrochloride) | 8.6 |
| Sodium chloride | 27 |
| Zinc chloride | 62.5 |

This solution, which contains an excess of hydrochloric acid, may be used directly to prepare N-(5-nitrofurfurylidene)-3-amino-2-oxazolidone by the following method, for example:

20 ml. of an aqueous solution of formaldehyde (40%) and 21 grams of crystalline 5-nitrofurfural diacetate were added to the resultant solution of Example I. The mass was brought to 80° C. while stirring and this temperature was maintained for 30 minutes. The appearance of a yellow coloration was observed, then N-(5-nitrofurfurylidene)-3-amino-2-oxazolidone began to precipitate in the form of bright yellow crystals. After standing overnight, the crystals were separated by filtration, washed with water and dried at 100° C. 20 grams of practically pure N-(5-nitrofurylidene)-3-amino - 2 - oxazolidone was obtained.

What I claim is:

1. The process for the preparation of 3-amino-2-oxazolidone hydrochloride which comprises
   (a) heating a mixture of monoethanolamine and urea,
   (b) cooling and nitrosating,
   (c) heating the resultant solution to liberate nitrogen,
   (d) cooling and nitrosating,
   (e) cooling and adding a reducing agent, and
   (f) filtering to obtain said 3-amino-2-oxazolidone hydrochloride.

2. The process for the preparation of 3-amino-2-oxazolidone hydrochloride which comprises
   (a) heating a mixture of monoethanolamine and urea to a temperature of from about 110° C. to about 115° C.,
   (b) cooling and introducing an aqueous solution of sodium nitrite,
   (c) acidifying the resultant solution and heating to a temperature above 20° C. to effect liberation of nitrogen,
   (d) cooling and introducing an aqueous solution of sodium nitrate,
   (e) cooling and adding powdered zinc, and
   (f) filtering to obtain said 3-amino-2-oxazolidone hydrochloride.

3. The preparation of 3-nitroso-2-oxazolidone hydrochloride by mixing monoethanolamine and urea, nitrosating, denitrosating and cyclizing, nitrosating, reducing and filtering.

References Cited by the Examiner

UNITED STATES PATENTS

| | | | |
|---|---|---|---|
| 2,826,587 | 3/58 | Trask et al. | 260—307 |
| 2,908,689 | 10/59 | Gever | 260—307 |
| 3,000,939 | 9/61 | Frankel | 260—553 |
| 3,098,872 | 7/63 | Weakly et al. | 260—553 |

OTHER REFERENCES

Gabriel, Ber. Deut. Chem., vol. 47, pages 3028–3033 (1914).

NICHOLAS S. RIZZO, *Primary Examiner.*